United States Patent [19]
Osaki

[11] Patent Number: 5,414,697
[45] Date of Patent: May 9, 1995

[54] DATA TRANSMISSION CONTROL SYSTEM
[75] Inventor: Yoshiro Osaki, Hachioji, Japan
[73] Assignee: Kabushiki Kaisha Toshiba, Kawasaki, Japan
[21] Appl. No.: 94,224
[22] Filed: Jul. 21, 1993
[30] Foreign Application Priority Data
Jul. 22, 1992 [JP] Japan .................................. 4-195560
[51] Int. Cl.⁶ .......................... H04J 3/14; H04L 12/56
[52] U.S. Cl. ...................................... 370/17; 370/60.1; 370/85.6; 370/94.2
[58] Field of Search .................... 370/13, 16, 17, 58.1, 370/58.2, 58.3, 60, 60.1, 61, 79, 82, 84, 85.6, 94.1, 94.2, 110.1, 118; 340/825.03, 826, 825.06, 825.5, 825.51; 379/1, 9, 242, 258, 268, 269

[56] References Cited
U.S. PATENT DOCUMENTS
| | | | |
|---|---|---|---|
| 4,550,399 | 10/1985 | Caron | 370/118 |
| 5,040,171 | 8/1991 | Osaki | 370/17 |
| 5,153,877 | 10/1992 | Esaki et al. | 370/94.1 |
| 5,179,556 | 1/1993 | Turner | 370/84 |
| 5,267,232 | 11/1993 | Katsube et al. | 370/17 |
| 5,280,470 | 1/1994 | Buhrke et al. | 370/17 |

*Primary Examiner*—Alpus Hsu
*Attorney, Agent, or Firm*—Finnegan, Henderson, Farabow, Garrett & Dunner

[57] ABSTRACT

A data transmission control system in which each terminal sends to a node connected to the terminal a call setting signal including data transmission band parameters such as best and worst band values and call priority required for call setting. Each node manages the data transmission band parameters for each call, the node when detecting generation of a call with high priority calculates a new data transmission band of an associated call with low priority as necessary, and sends a control signal for change of the data transmission band to the terminal handling the associated call even during communication of the associated call. The terminal changes the current data transmission band to the data transmission band indicated by the control signal to thereby control the data transmission band even when the terminal is in a communication state, whereby line traffic can be flattened and line operating efficiency can be increased.

11 Claims, 10 Drawing Sheets

| CALL NUMBER 401 | REQUEST MINIMUM BAND 402 | REQUEST MAXIMUM BAND 403 | CURRENT ALLOCATION BAND 404 | PRIORTY 405 |
|---|---|---|---|---|
| 001 | 64kbps | 64kbps | 64kbps | 1 |
| 002 | 16kbps | 384kbps | 64kbps | 5 |
| | | | | |
| | | | | |

FIG.4

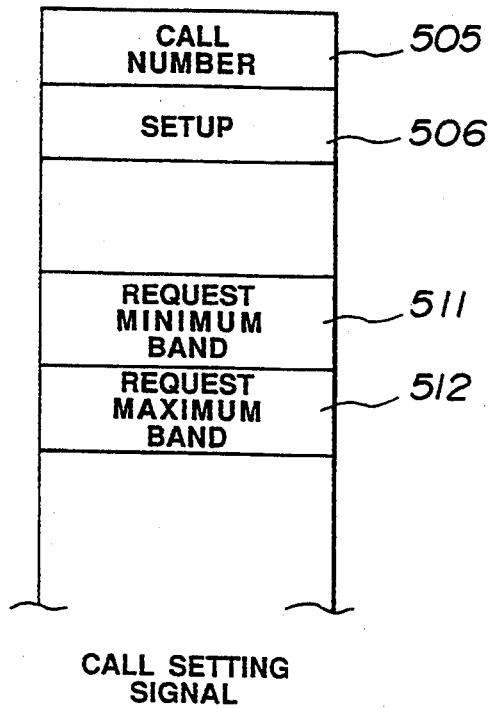
FIG.5(a) CALL SETTING SIGNAL
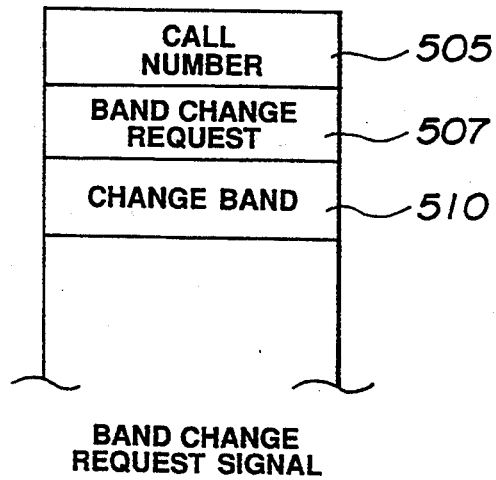
FIG.5(b) BAND CHANGE REQUEST SIGNAL
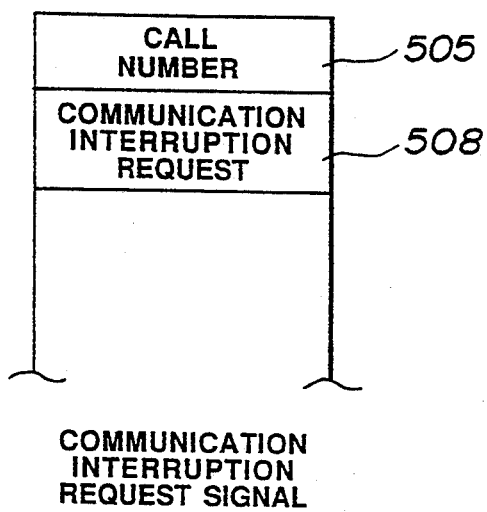
FIG.5(c) COMMUNICATION INTERRUPTION REQUEST SIGNAL
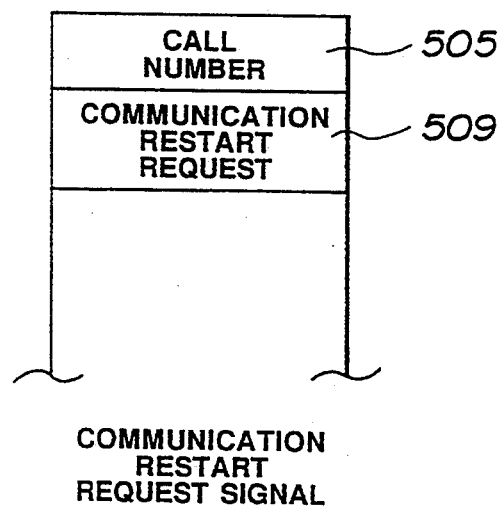
FIG.5(d) COMMUNICATION RESTART REQUEST SIGNAL

DATA TRANSMISSION CONTROL SYSTEM

BACKGROUND OF THE INVENTION

1. Field of the Invention

The present invention relates to data transmission control systems which can suitably control the amount of data to be transmitted in a network system such as an ATM (asynchronous transfer mode) exchange system, on the basis of different data parameters including, for example, priority parameters of data requiring immediateness or real time communication, priority parameters of mail data less requiring the immediateness and possible variable transmission band parameters, so as to realize effective use of communication lines of the network system, and more particularly, to a data transmission control system which, even during communication after a call is set by a terminal connected to the network system, can suitably control the amount of data to be transmitted in the network.

2. Description of the Related Art

As light transmission techniques are developed these years, it has been possible to transmit a wide range of data relatively inexpensively. In order to comply with such a situation, an ATM-based communication system has been studied and examined even in the Comite Consultatif International Telegraphique et Telephonique (CCITT). The ATM communication system refers to one where, substantially on the same principle as a high-speed packet system, data is divided into packets of a short fixed length called 'cells' and the cells are asynchronously transmitted for data exchange.

Accordingly, in the ATM communication system, there may occur such a situation that a cell is discarded due to temporary traffic variations. In order to avoid such a situation, in an exchange system based on the ATM communication system, a method for determining at the time of call setting the number of cells of the call to be transmitted has been suggested. In this cell-number determining method, consideration is paid to the fact that cells are statistically multiplexed so that parameters for each call are statistically calculated to grasp the call acceptable by the exchange system.

However, even when the cell-number determining method is employed for the call setting, since the quality of each call must be maintained, cells are not always transmitted on actual communication lines and thus the communication lines are set with a certain degree of allowance.

For example, even when such calls having relatively loose discard quality as voice, e.g., calls having a discard rate of about $10^{-3}$ are multiplexed on a communication line having a relatively narrow band of 1.5 Mbps, the capacity of the communication line having a sufficient allowance is set, which results in that only 80% of cells can be multiplexed on the line. Thus, in this case, it cannot be that the line is efficiently used.

For the purpose of realizing efficient line use, it is considered to multiplex calls irrespective of discard quality such as mail transmission, i.e., calls having high discard priority levels on the line, to thereby realize more efficient use of the line. In the case of such calls as mail transmission, however, the call band is usually set to be somewhat large. For this reason, when there are many calls having ordinary quality, concentrated transmission of cells of calls having low discard quality involves such a problem that the respective traffics of the cells of such calls are mutually canceled with the result that the calls having low discard quality are extremely reduced in data passage rate.

Thus, in order to effectively multiplex calls having no time transparency and allowing a certain degree of cell discard on the line without fixedly determining the band, it is necessary during call continuation to somehow modify the data transmission format, e.g., to modify the data transmission band of the terminal.

However, it is impossible in the current call setting procedure to modify the data transmission format. This will be explained by referring to FIG. 10 showing the call setting procedure carried out in ordinary communication. That is, as shown in FIG. 10, in the current communication, the data transmission format, e.g., data transmission band, required by a user terminal at the time of call setting is continued until the call is completed, thus making it impossible to change the transmission format of the data.

Accordingly, when such current call setting procedure as mentioned above is employed, it is impossible during the call continuation to change the data transmission format of the user terminal in accordance with the operating state of the network. Thus, even when a terminal having a low call priority and requiring no immediateness is present in the exchange system, it is impossible to realize finely-controlled and flexible data transmission with effective use of the line.

In this way, such a transmission system which performs data multiplexing in statistic manner as the ATM communication system has been defective in that, during continuation of a call transmitted from a user terminal, it is difficult to attain fine control over the data transmission of the user terminal according to the call discard quality, call use band, the variability of the use band, etc., and thus it is difficult to realize effective use of lines.

SUMMARY OF THE INVENTION

When the existing call setting procedure is employed, it is impossible to change the preset data transmission format until the call is finished. Thus, the resource should be allocated with considerable allowance, which results in inefficient usage of the line.

It is therefore an object of the present invention to provide a data transmission control system which can flexibly control a terminal transmitting a cell having a low priority and a variable data transmission band and also requiring no immediateness to realize a sufficiently high line operating efficiency.

In accordance with an aspect of the present invention, the above object is attained by providing a data transmission control system in a data transmission system having a plurality of terminals connected to a network having a plurality of nodes, wherein, when the plurality of terminals call the plurality of nodes connected to the plurality of terminals, a call setting signal having data transmission format parameters including a priority of data to be transmitted is transmitted and a data transmission state of the data transmission system is optimumly controlled on the basis of the data transmission format parameters; each of the plurality of nodes comprises storage means for storing therein the data transmission format parameters of calls being currently set in its own node, processing means for monitoring a traffic state of the own node, and when the monitored traffic state exceeds a range of traffic density managed by the own node, for changing the data transmission format parameters of a call with a low priority to an optimum value within the range of the traffic density managed by the own node on the basis of the priorities of the data transmission format parameters of the calls stored in the storage means, and transmission means for transmitting a call control signal, containing the data transmission format parameters to be changed, to a terminal handling the call to be changed by the processing means.

Thus, even when change in the traffic state takes place during call continuation, each node dispersedly performs fine and flexible control over the transmission data format of the call handled by the terminal, whereby an optimum transmission state can be always maintained in the network.

In accordance with another aspect of the present invention, a control node for performing centralized control over a plurality of nodes and having relationship data between the current call setting states of the plurality of nodes and terminals connected to the plurality of nodes is provided in a network, each node sends a call control signal including data transmission format parameters to be changed not to the associated adjacent node but to the control node, and the control node sends the call control signal including the data transmission format parameters to a node handling the call to be changed.

Since the control node collects the data transmission format parameters to be changed which are issued from the nodes and transmits the parameters directly to the node connected with the associated terminal, even when a traffic fluctuation takes place during the call continuation, control for maintaining the optimum transmission state of the network can be quickly attained.

BRIEF DESCRIPTION OF THE DRAWINGS

FIG. 4 is a table showing a structure of data stored in a band management table in FIG. 3;

FIGS. 5(a) to 5(d) show structures of basic data elements for call control signals used in the present embodiment;

DESCRIPTION OF THE PREFERRED EMBODIMENTS

An embodiment of the present invention will be explained with reference to the accompanying drawings.

Figure 1:
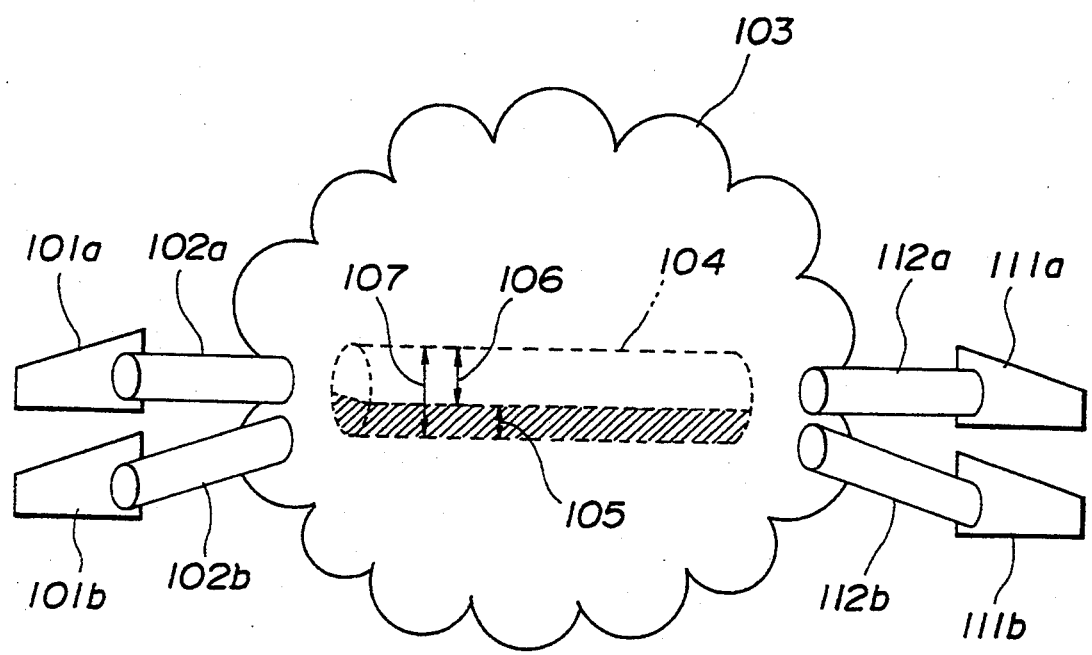
FIG. 1 is a diagram for explaining the concept of data transmission control in accordance with the present invention.

Referring first to FIG. 1, there is shown a diagram for explaining the basic concept of the present invention. The drawing of FIG. 1 includes a network 103, lines 102a, 102b, 112a, 112b connected to the network 103, and terminals 101a, 101b, 111a, 111b connected to the network 103 through the lines 102a, 102b, 112a, 112b. Through cell multiplexing of fixed-length packets based on an ATM communication system, the lines 102a, 102b, 112a, 112b, which connect the network 103 and the terminals 101a, 101b, 111a, 111b respectively, transmit user data from the terminal 101a or 111a to the terminal 111a or 101a or from the terminal 101b or 111b to the terminal 111b or 101b; and the lines also transmit call control signals between the network 103 and the terminals 101a, 101b, 111a, 111b.

In the illustrated example, the network 103 has a plurality of nodes (not shown) and is actually arranged in such a manner as to relay data and signals through the nodes through complicatedly interconnected lines, but physical lines between the terminals 101a and 111a and between the terminals 101b and 111b are illustrated in the form of virtual one 104 of the lines. Thus, it will be appreciated that, although only the terminals 101a, 101b, 111a, 111b are connected to the network 103 in FIG. 1, a plurality of terminals not shown are also actually connected to the network 103.

Brief explanation will next be made as to the operation of the present embodiment.

A width 107 of the virtual physical line 104 shared by the terminals 101a, 111a and 101b, 111b indicates a possible maximum transmission band of the physical line which can be prepared by the network 103 between the terminals 101a and 111a and between the terminals 101b and 111b. Further, a width 106 indicates an excess band on the virtual physical line 104 which can be currently used, and a width 105 indicates a band being currently used.

It is assumed herein that transmission of data with high priority is carried out between the terminals 101a and 111a, transmission of data with low priority is carried out between the terminals 101b and 111b, and in the current state shown, the data transmission with low priority is carried out.

When the terminal 101a transmits a call setting request signal to the network 103 to perform a call setting with the terminal 111a, then the network 103 accepts this requested call if the excess band 106 is present in the virtual physical line 104.

When the sufficient excess band 106 is not present in the virtual physical line 104, on the other hand, since this request call is higher in priority than the call between the terminals 101b and 111b, it is required to remove the band of the call having the low priority. If the removal of the band of the low priority call is possible, then the network 103 sends a band change request signal for modification of the band being currently used between the terminals 101b and 111b through the line 102b or 112b to the terminal 101b or 111b to control the data transmission band between the terminals 101b and 111b.

When it becomes necessary to remove the band of the low priority call in the network as mentioned above, it is required to control the data transmission band of the associated terminal, i.e., the data transmission rate. For achieving this control, it is necessary to first calculate the band of the low priority call to be removed. For execution of the calculated band removal operation, it is necessary to transmit a calculated band removal signal through the network to the associated terminal.

There are two methods of executing the above band removal operation, which follow.

Figure 2:
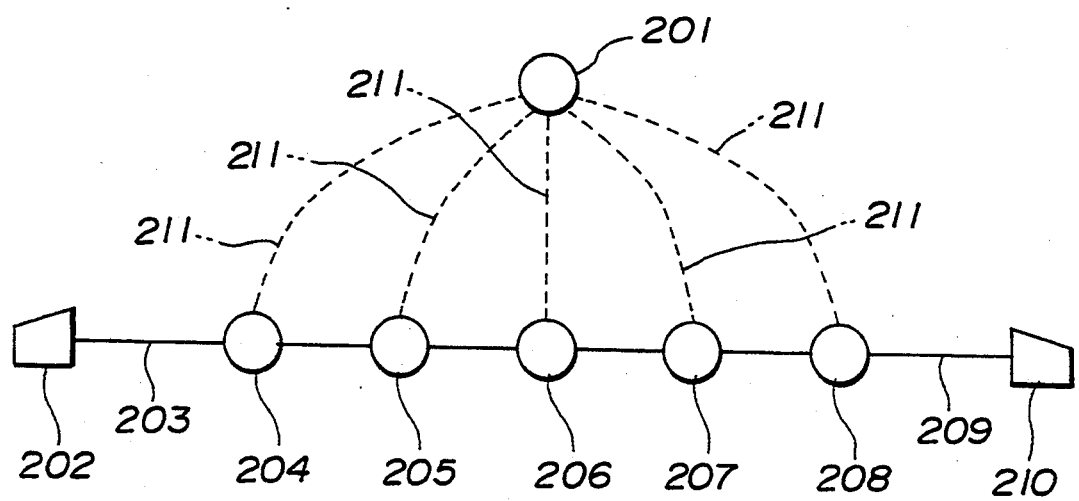
FIGS. 2(a) and 2(b) show diagrams for explaining two management/transmission systems for executing band reduction.
Figure 2:
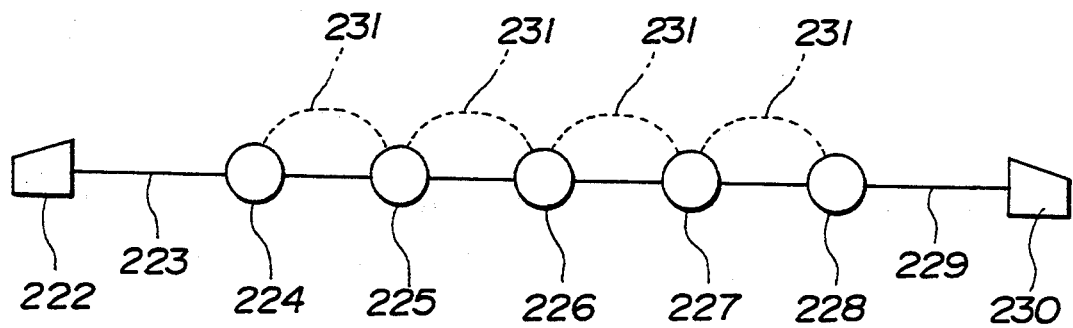

Shown in FIGS. 2A and 2B are diagrams for explaining the aforementioned two management/transmission methods for execution of the band removal operation.

FIG. 2(a) shows an example of configuration implementing one of the management/transmission methods in which a special centralized control node 201 for performing centralized control over call data is provided in the network so as to collectively receive and analyze the call data of all nodes 204 to 208 through node control signal lines 211 and then to inform the associated nodes of its analysis result.

For example, when the node 206 requires removal of the call band on a trunk line connected thereto, the node 206 informs the centralized control node 201 of the generated call data. The centralized control node 201 in turn informs the node 204 handling the associated call of the data of the node 206. The node 204 accommodating an associated terminal 202 informs the terminal 202 of the data requirement of the node 206 through a line 203.

FIG. 2(b) shows an example of a configuration implementing the other of the aforementioned two band removal execution methods in which no special control node is provided in a network and respective nodes control their own call data in a distributed manner.

For example, when required to remove the band of a call on a trunk line connected to a node 226, the node 226 analyzes the band removal, informs an associated adjacent node 225 of its analysis result through an associated inter-node control signal line 231, the informed adjacent node 225 further informs an associated node 224 of the data requirement of the node 226, and so on. In this way, the data requirement of the node 226 is informed to all the associated nodes associated with the call. Even in the case of this distributed control, as in the centralized control of FIG. 2(a), among the nodes receiving the data of the node 226, the node 224 connected to the associated terminal informs a terminal 222 of the data requirement through a line 223.

Explanation will be made as to the control of the data transmission band based on the distributed control of FIG. 2(b).

Figure 3:
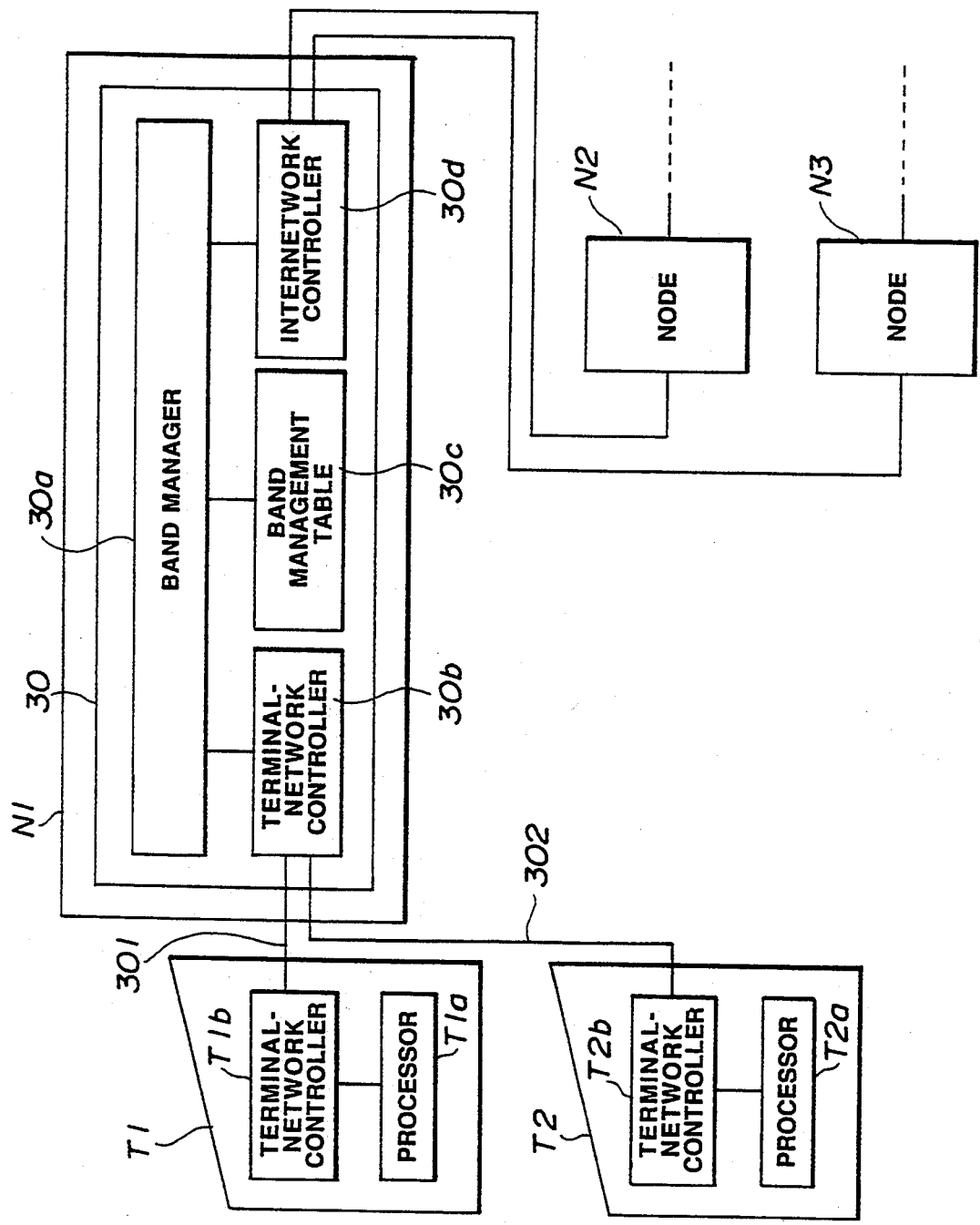
FIG. 3 is a block diagram of a part of a data transmission control system of a data transmission system for controlling a terminal data transmission band based on distributed management of nodes in a network.

Referring to FIG. 3, there is shown a part of a data transmission control system of a data transmission system for controlling the data transmission band of a terminal based on the distributed control of nodes in a network.

In FIG. 3, a terminal T1 is connected through a line 301 to a node N1 in the network, and a terminal T2 is connected through a line 302 to the node N1 in the network. Nodes other than the nodes N1 to N3 or terminals other than the terminals T1 and T2 are omitted for simplicity of the explanation.

The terminals T1 and T2 have processors T1a and T2a for preparing and processing a predetermined data packet and terminal-network controllers T1b and T2b for resolving the data packet prepared by the processors T1a and T2a into predetermined cells for its transmission control or for assembling input predetermined cells into a predetermined data packet, respectively.

Here, a packet comprises data which constitutes a portion of a call inputted from a terminal, and the cell is the fixed minimum length of data that can be processed in a node. Basically, the data are in a nested state, that is, the data of the call are composed of the data of the variable length packets; and each packet is composed of the fixed length cells.

The node N1 includes a node controller 30 which in turn has a band manager 30a for managing a band, a terminal-network controller 30b for processing a call control signal between the terminals T1 and T2 according to a predetermined protocol, an inter-network controller 30d for processing a call control signal between the other nodes N2 and N3 according to a predetermined protocol, and a band management table 30c storing therein data associated with the band of calls belonging to its own node. The nodes N2 and N3 have substantially the same arrangement as the node N1 respectively, except for the different numbers of terminals and nodes to be connected for the different nodes.

With such an arrangement, when the terminal T1 issues a calling request to the node N1 through the line 301, the terminal-network controller 30b of the node controller 30 receives the calling request and outputs data associated with the call to the band manager 30a. The band manager 30a in turn, on the basis of the data on the band of each of calls in the band management table 30c, collates the data of the call with the data of the bands of all the calls belonging to the current node N1, and when the transmission is possible in the maximum possible transmission band of its own node N1, accepts the call. Further, the band manager 30a, even when the data exceeds the maximum possible transmission band, performs traffic calculation by making reference to the data of the bands of the calls in the band management table, and calculates an analysis result to determine whether to change the band of the other call or the band of its own call or to temporarily interrupt the other calls. On the basis of this analysis result, the band manager 30a sends a band change request signal or other request signal to the terminal or adjacent node handling the call for the band to be changed or to be temporarily interrupted. In this connection, the aforementioned request signal may include a request signal for changing the band or for temporarily interrupting communication (to be described later) or a communication restart request signal for restarting a temporarily-interrupted communication.

When the terminal to be subjected to the band change has the call issued and requested by the terminal T1, T2 connected to the own node N1, the band change request signal is sent to that terminal. Meanwhile, when a terminal connected to another node such as N2 or N3 issues a calling request, the band change request signal is transmitted to the associated node connected to this terminal, so that the node N1 sends the band change request signal to the adjacent node associated with this call. And the adjacent node sequentially sends the band change request signal to the nodes associated with the call, and the band change request signal is eventually transmitted to the associated node connected with the terminal having the call.

When the band change request signal is transmitted to the associated node connected with the terminal to be subjected to the band change, etc. in this way, the associated node sends the band change request signal to the terminal to be subjected to the band change, etc. The terminal, after receiving the band change request signal, changes the band of the call, temporarily interrupts the communication or restarts the communication.

Explanation will then be made as to the band data of the respective calls stored in the band change table 30c.

FIG. 4 shows a structure of the data stored in the band management table 30c. Stored in the band management table 30c are, with respect to call numbers 401 to be handled by its own node, request minimum bands 402 for respective calls, request maximum bands 403 for the calls, current allocation bands 404 and priorities 405 being currently allocated to the calls.

With respect to an ordinary call requiring immediateness, if a pre-demanded band is not guaranteed, then communication cannot be continued. Thus, the values of the request minimum band 402, request maximum band 403 and current allocation band 404 are equal to each other. For example, in the case of the communication by the telephone terminal, the request minimum band and request maximum band are both equal to the value of the current allocation band of 64 kbps. Such a call is set to be high in priority. For example, the call is stored to have a priority of "1". Of course, all of these band data can be obtained from band data included in a call setting signal (which will be explained later).

Meanwhile, a call using the request minimum band 402 and request maximum band 403, as in the case of the mail data especially to be handled in the present invention, less requires immediateness and allows loose variation of delay time variation. Thus such a call is used when even the use band can be made temporarily small in some cases. That is, the minimum transmission band necessary for transmission of the mail data is stored in the request minimum band 402 while the maximum transmission band transmittable from the physical arrangement of the terminal is stored in the request maximum band 403. Such a call having no time transparency as this mail data is usually stored with a low transmission priority. When a call having a high priority is generated during communication, the call having a low priority is changed to have a small value between the values of the request minimum band 402 and request maximum band 403. For example, when the priority is "5" lower than "1", the request minimum band is 16 kbps, the request maximum band is 384 kbps and the current allocation band is 64 kbps; the call is changed to have a suitable band between the request maximum and minimum bands of 384 kbps and 16 kbps.

The format of call control signals for control of the band change will next be explained.

The control signals have substantially the same format as the ordinary call setting signal.

Shown in FIGS. 5(a), 5(b), 5(c) and 5(d) are structures of basic data elements of the call control signals used in the present embodiment. First, FIG. 5(a) shows a structure of a call setting signal which includes a call number 505 for identifying a call, a 'SETUP' 506 indicative of the fact that the signal is of the call setting type, a request minimum band 511 as an area for inserting therein the minimum band requested by the call, and a request maximum band 512 as an area for inserting therein the maximum band requested by the call. Since the call setting signal of the present embodiment is based fundamentally on a call setting signal being used in the current call control, the call setting signal also includes as a bearer attribute, in addition to this data, the value of a band requested. The call setting signal has a data type by which the priority can be known.

FIG. 5(b) shows a band change request signal which is used when the network requests a terminal to change the band. The band change request signal includes the call number 505 similar to that of the call setting signal, a 'band change request' 507 indicating the signal is of the band change request type, and a change band 510 as an area for inserting therein a band to be changed.

FIG. 5(c) shows a communication interruption request signal which is used when a temporary interruption is requested due to some circumstances of the network. The communication interruption request signal contains the call number 505 and a 'communication interruption request' 508 indicating that the signal is of the communication interruption request type.

FIG. 5(d) shows a communication restart request signal which is used for restarting temporary interrupted data transmission. This signal, as same to the communication interruption request signal, includes the call number 5051 and a communication restart request 509 indicative of that the signal is of the communication restart request type.

Such call control signals are transmitted through a control channel of an ISDN line.

The call setting signal requested by a terminal, the band change request signal, communication interruption request signal and communication restart request signal indicated by the network node are used to optimize the band use of the data transmission system.

Explanation will next be made as to how to control the band change of the data transmission system based on the centralized control of FIG. 2(a).

Figure 6:
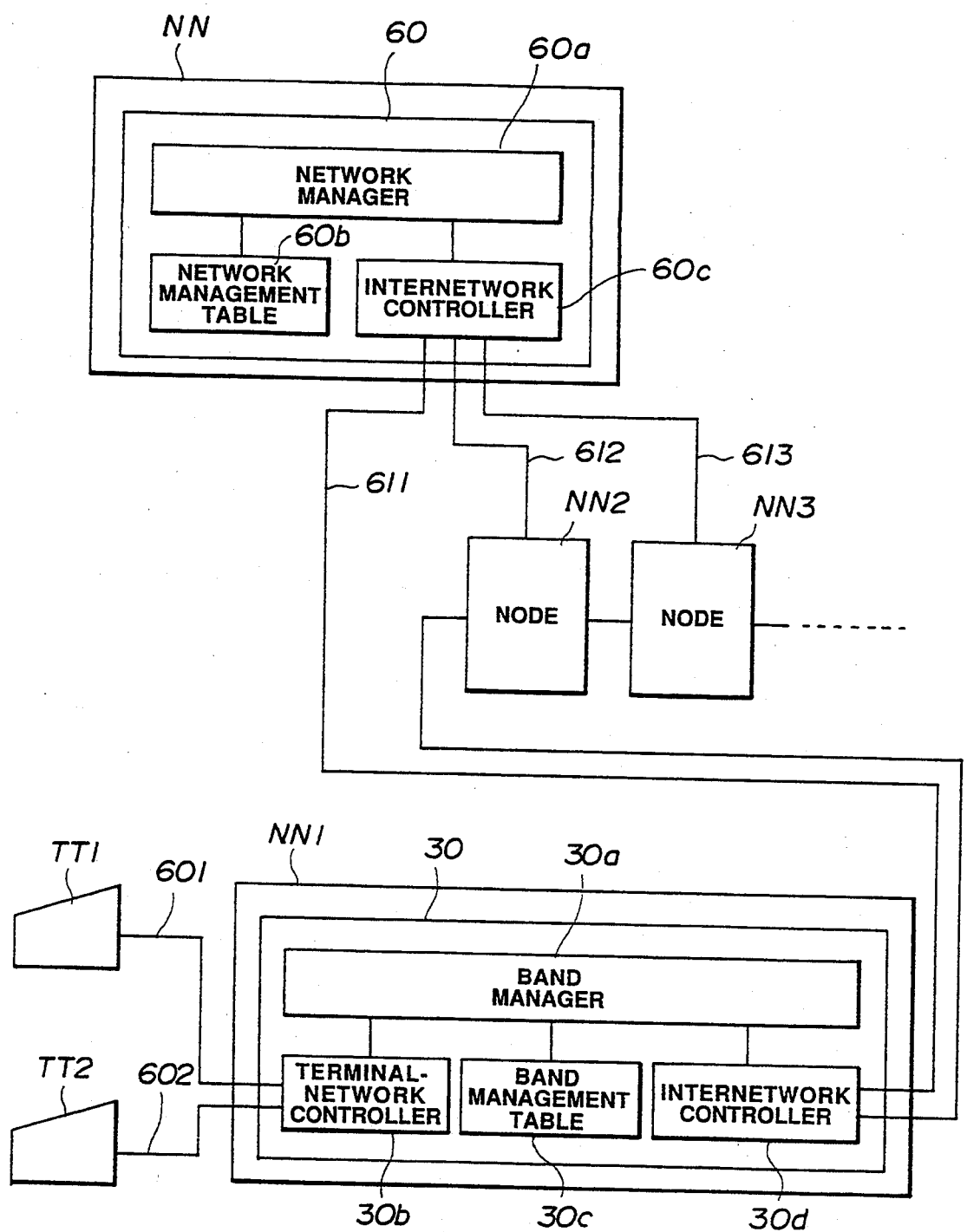
FIG. 6 is a block diagram of a part of the data transmission control system of the data transmission system for controlling a terminal data transmission band based on centralized management shown in FIG. 2(a)

FIG. 6 shows a part of a data transmission control system of a data transmission system for controlling the data transmission band of a terminal based on the centralized control of FIG. 2(a).

FIG. 6 shows a detailed arrangement of FIG. 2(a) in which a centralized control node NN, which corresponds to the node 201, exclusively performs traffic control. Further, terminals TT1 and TT2 and nodes NN1 to NN3 have substantially the same structures as the terminals T1 and T2 and the nodes N1 to N3 in FIG. 3 respectively. The elements having the same functions as the elements in FIG. 3 are denoted by the same reference numerals.

In the distributed control of FIG. 3, the node requiring the band change, etc. sends a call control signal associated with the band change, etc. sequentially to adjacent nodes handling the call to be subjected to the band change, so that the call control signal is eventually transmitted to the terminal handling the call. Meanwhile, in the centralized control of FIG. 6 based on the centralized control node, the node required to be subjected to the band change, etc. is not the adjacent node and the call control signal associated with the band change etc. is sent to the centralized control node NN.

More in detail, the centralized control node NN includes a network manager 60a for managing the traffic of the data transmission system, a network management table 60b for controllably storing therein the communication states of all the nodes with respect to the nodes and calls, and an inter-network controller 60c for controlling interconnection between the nodes NN1 to NN3. When the node NN1 requires band change of a call to be handled by its own node, the node NN1 sends the data of the call associated with the band change to the network manager 60a through an inter-network controller 30d, a line 611 and the inter-network controller 60c.

The network manager 60a, on the basis of the network management table 60b, searches the node to which the terminal handling the call associated with the band change is connected, and sends the band change request signal directly to the searched node. The node, when receiving the band change request signal, sends the-band change request signal to the terminal handling the call whose call number is indicated in the band change request signal. The terminal, when receiving the band change request signal, performs its band changing operation over the corresponding call.

By the provision of such a centralized control node as to perform centralized control operation, the transmission in the data transmission control can be made quick and the control traffic in the network can be reduced.

Next, explanation will be directed to the communication procedure between a terminal and a network when the aforementioned band change, temporary communication interruption and communication restart are carried out based on the aforementioned distributed or centralized control system.

Figure 7:
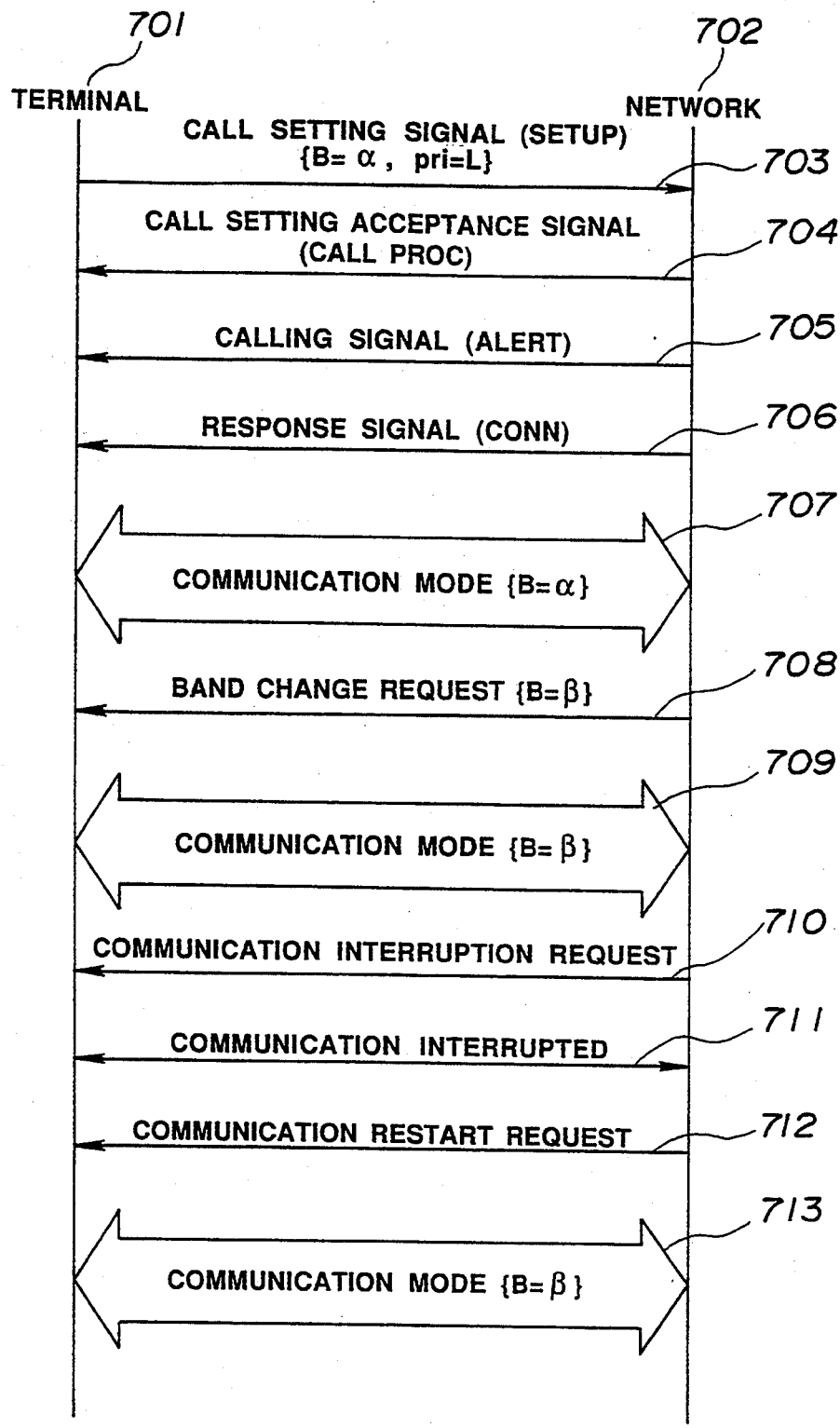
FIG. 7 is a diagram showing an exemplary sequence of call setting, band modification between a terminal and a network after the call setting, temporary communication interruption and restoration when a call setting signal is used.

Shown in FIG. 7 is an exemplary sequence of the band change, temporary communication interruption and communication restart between the terminal and network at the time of call setting and after the call setting with use of a call setting signal.

More specifically, a call setting signal 703 is first sent from a terminal 701 to a network 702. In the call setting signal, a band $\alpha$ and a low priority L are designated. Also included in the signal 703 are the minimum and maximum of the request band. Thereafter, in the same manner as the ISDN procedure prescribed by the CCITT, a call setting acceptance signal (CALLPROC) 704, a calling signal (ALERT) 705 and a response signal (CONN) 706 are issued from the network 702 to complete the call setting. This enables the terminal 701 to communicate with the party terminal with use of the band $\alpha$ (communication mode 707). During the communication 707, when it is desired to change the band of the terminal 701 for some reason of the network 702 side such as a traffic fluctuation, the network 702 sends a band change request signal 708 to the terminal. Since the band change request signal 708 indicates change of the band to $\beta$, after the band change, communication between the network 702 and terminal 701 is carried out with the band $\beta$ (communication mode 709). Further, when the network 702 sends a communication interruption request signal 710 to the terminal 701 in order to temporarily stop the data transmission of the terminal 701, the data transmission from the terminal 701 is temporarily stopped (communication interruption mode 711). When the network 702 sends a communication restart request signal 712 to the terminal for allowing data re-transmission of the terminal 701 by virtue of change in the traffic density, etc., the communication between the network and terminal is again carried out with the band $\beta$ used before the temporary interruption of the communication (communication mode 713). In this case, the communication may be of course restarted with a band $\gamma$ different from the previous band $\beta$ on the basis of the analysis result of the band manager.

A difference in network traffic between the cases where such a band change is carried out and not carried out is shown in FIGS. 8(a), 8(b), 8(c), 8(d) and 8(e).

Figure 8A:
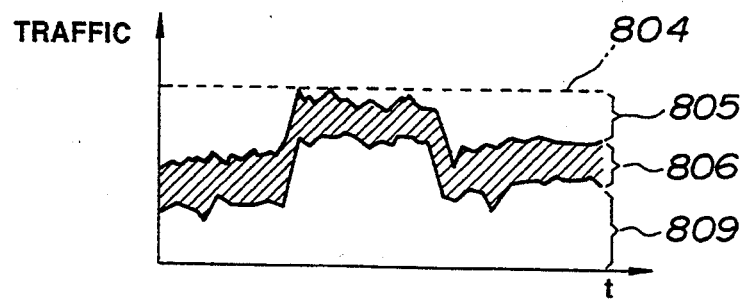
FIGS. 8(a) to 8(e) show diagrams for explaining a difference in traffic between networks when band modification of the present invention is carried out and when the band modification is not carried out.

In more detail, FIG. 8(a) shows a traffic state when the prior art band management is carried out. In this case, a total of a traffic 809 with a high priority and a traffic 806 with a low priority is a total traffic, and a traffic exceeding a value for a line 804 indicative of the maximum band transmittable through a line between terminals is discarded. FIG. 8(a) is an example when bands are previously fixedly allocated for calls with low and high priorities at the time of call setting, and thus all of the traffics are transmitted without being discarded. In FIG. 8(a), however, there is a part 805 which is not used by the line between the terminals. This means that the line is not efficiently used.

Figure 8B:
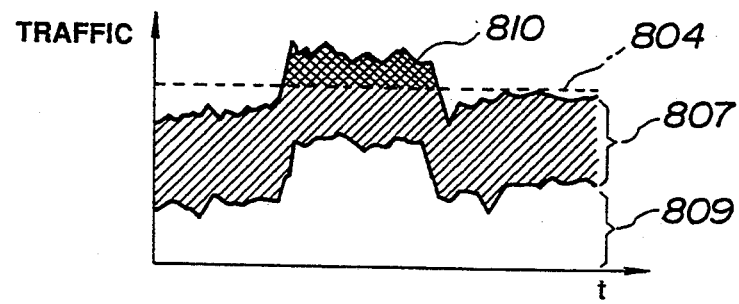

FIG. 8(b) shows a traffic when a somewhat large band is allocated at the time of previously setting a call with a low priority. This case is highly effective when the traffic on the line is relatively less, but as the traffic with the high priority increases, a large amount of traffic 810 is discarded. Since the discard traffic corresponds to the call with the low priority, this does not affect especially the call with the high priority. However, in such an environment that such discard frequently takes place, the data passage rate of packets of the call with the low priority between the terminals is extremely decreased.

Figure 8C:
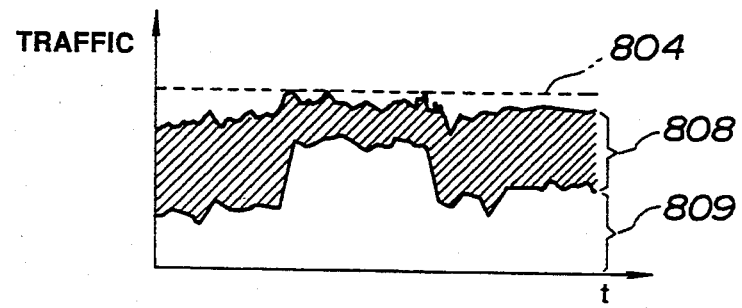
Figure 8D:
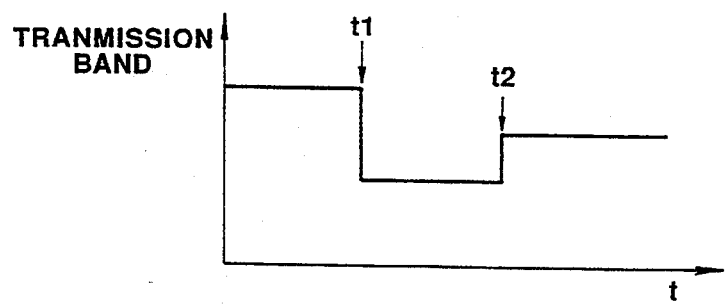

FIG. 8(c) shows a traffic when the band change procedure of the present embodiment is applied. In this case, at time points t1 and t2 in FIG. 8(d), a band change call control signal is transmitted from the network to the terminal, whereby the terminal changes the cell transmission band. As a result, a traffic 808 with a low priority is not discarded extremely.

Figure 8E:
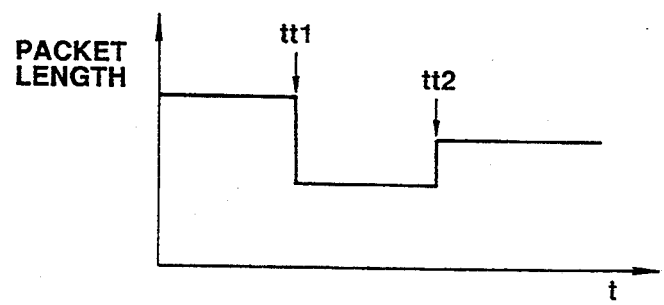

FIG. 8(e) shows a method for changing the cell transmission format of the terminal, in which the length of a packet made up of a plurality of data cells is changed. In this case, as in FIG. 8(d), at a time point tt1 corresponding to the time point t1 of FIG. 8(d) and a time point tt2 corresponding to the time point t2 of FIG. 8(d), a packet length change signal indicative of packet length change is sent from the network to the terminal. Since the traffic remains the same after and before the change of the packet length, the traffic varies as shown in FIG. 8(b) and thus traffic improvement cannot be expected. However, this leads to such an effect that, since the terminal handles the packet as data unit, shortened packet length causes reduction of the number of cells in the packet, whereby there can be decreased a possibility of extremely reducing the packet passage rate between the terminals.

In this case, the possible maximum packet length, possible minimum packet length and current packet length are stored in the band management table of each node as its contents. Further, the band change request signal contains a change packet length. Furthermore, the band manager calculates an optimum packet length even with respect to the packet length to be changed, of course.

Explanation will next be made as to an example in which such a data transmission control system is applied.

Figure 9A:
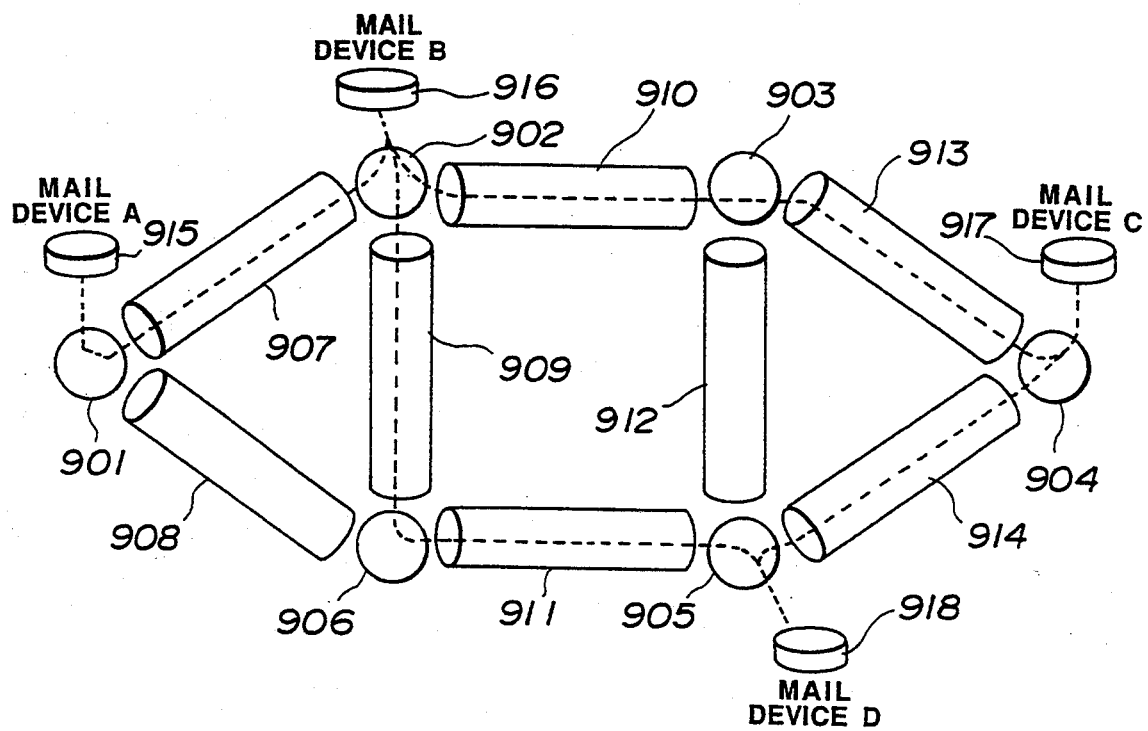
FIGS. 9(a) and 9(b) show an example in which the data transmission control system of the data transmission system is based on a dispersed management shown in FIG. 2(b)
Figure 9B:
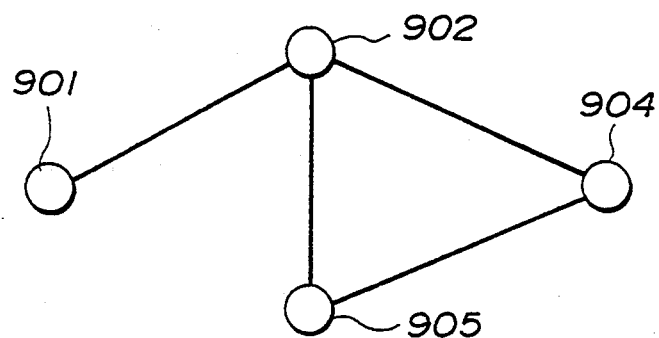
Figure 10:
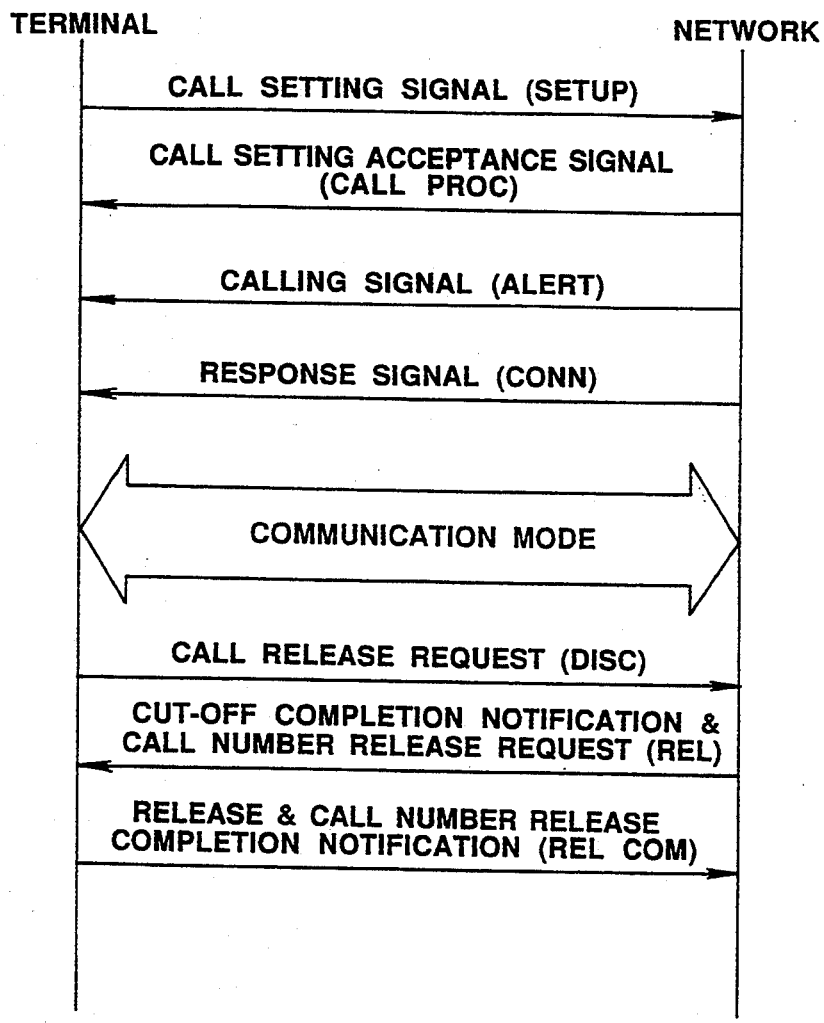
FIG. 10 is a diagram for explaining a prior art call setting procedure.

FIGS. 9(a) and 9(b) show an application example of the data transmission system in which the data transmission control system based on the distributed control of FIG. 2(b) is employed.

The data transmission system of FIG. 9(a) includes a network of exchange nodes 901 to 906 and a mail transmission system of mail transmission devices 915 to 918. The mail transmission devices 915 to 918 are interconnected by means of lines 907 to 914. (In the drawing, the interconnections are shown by dotted lines.) FIG. 9(b) shows only the interconnection relationship of FIG. 9(a).

Each of the nodes 901, 902, 904 and 905 has such a node controller as mentioned above, which node controller functions to control the connection to associated one of the main transmission devices 915 to 918. In the data transmission system having the mail transmission system, such other devices as telephone sets (not shown) or the like are connected to these nodes, as a matter of course. Such telephone sets cause variation of the network traffic.

The interconnection between the mail transmission devices 916 and 917 is achieved by means of the lines 910 and 913. For example, when a new call having a high priority is generated on the lines, e.g., when a terminal connected to the node 903 generates a call having a priority higher than the mail data call, the node 903 detecting the generated call transmits a band change request signal to the nodes 902 and 904 which in turn sends the band change request signal to the respective mail transmission devices 916 and 917. This results in that the data transmission rate between the nodes 902 and 903 is decreased, but the request of the call with the high priority issued from the node 903 can be accepted. In this way, at each node, a call requiring immediateness can be accepted and the operating efficiency of each line can be increased.

As has been explained in the foregoing, in accordance with the present embodiment, on the basis of the communication and resource management data of the ATM exchange system, the data transmission format of the associated terminal can be changed even during the call continuation between the network and terminal. In particular, with respect to such a call of low priority less requiring immediateness as mail data, the data transmission band can be previously set to be large. Further, even when the call is continued at the stage where the discard generation possibility becomes temporarily high, the band of a terminal call requiring no immediateness can be controlled quickly and flexibly to overall flatten the line traffic, whereby the line operating efficiency can be made large.

What is claimed is:

1. A data transmission control system in a data transmission system having a plurality of terminals connected to a network having a plurality of nodes, wherein, when the plurality of terminals call the plurality of nodes connected to the plurality of terminals, call setting signals having data transmission format parameters including a priority of data to be transmitted are transmitted and a data transmission state of the data transmission system is optimumly controlled on the basis of the data transmission format parameters, each node of the plurality of nodes comprising:

storage means for storing therein the data transmission format parameters of calls being currently set in the node;

processing means, after the data transmission format parameters of an inputted call setting signal are stored in the storage means, for monitoring a traffic state of the node on the basis of the data transmission format parameters stored in the storage means including the stored data transmission format parameters of the call setting signal for connecting the call designated by the call setting signal if the monitored traffic density does not exceed a range of a traffic density managed by the node when the call designated by the call setting signal is accepted, and for changing the data transmission format parameters of a call with a low priority to an optimum value within the range of the traffic density managed by the node on the basis of priorities of the data transmission format parameters of the calls stored in the storage means if the monitored traffic density exceeds the range of the traffic density managed by the node when the call designated by the call setting signal is accepted and, in the latter case subsequent to the changing to the optimum value, for connecting the call designated by the call setting signal; and transmission means for transmitting a first call control signal containing the data transmission format parameters to be changed to a terminal handling the call to be changed by the processing means.

2. A data transmission control system as set forth in claim 1, wherein each of the plurality of terminals includes change means for changing the call to a data transmission format indicated by the data transmission format parameters in the first call control signal transmitted from the transmission means.

3. A data transmission control system as set forth in claim 2, wherein the processing means, when the call to be changed is transmission data requiring no immediateness, changes the call to an optimum transmission band between a maximum transmission band and a minimum transmission band.

4. The system as set forth in claim 2, wherein the processing means monitors the traffic density of the node and, when the monitored traffic density exceeds the traffic density managed by the node due to the change of the data transmission format by the change means, changes the data transmission format parameters of the call with the low priority on the basis of the priorities in the data transmission format parameters of the calls stored in the storage means.

5. A data transmission control system as set forth in claim 1, wherein the data transmission format parameters stored in the storage means include a call number, a priority, a maximum transmission band, a minimum transmission band and a current allocation band, the priority being set to be higher in transmission data requiring immediateness than in transmission data requiring no immediateness.

6. A data transmission control system as set forth in claim 1, wherein the processing means, when a value indicated by the data transmission format parameters of the call with the low priority is to be changed to an optimum value outside an allowable range of the call, performs temporary interruption of the data transmission of the call to be changed, and the transmission means sends a call interruption control signal indicative of temporary interruption of data transmission of the call to the terminal handling the call whose data transmission is to be temporarily interrupted.

7. A data transmission control system as set forth in claim 6, wherein the processing means, when the traffic density managed by the node is decreased by releasing setting of other calls and thus the transmission of the call temporarily interrupted is enabled within a range of values indicated by the data transmission format parameters of the call being temporarily interrupted, changes the data transmission format parameters of the call and restarts the data transmission of the call being temporarily interrupted, and the transmission means sends a call restart signal including an indication of restart of the data transmission of the call and the data transmission format parameters of the call to a terminal handling the call whose data transmission is to be restarted.

8. A data transmission control system as set forth in claim 1, wherein the data transmission format parameters stored in the storage means include a call number, maximum and minimum packet lengths for the terminals, the processing means changes the packet length to a value between maximum and minimum packet lengths, and the transmission means sends a second call control signal indicative of change of the packet length of the call to the terminal handling the call to be changed.

9. A data transmission control system in a data transmission system having a plurality of terminals connected to a network having a plurality of nodes and a control node for performing centralized control over the plurality of nodes, wherein, when any of the plurality of terminals calls a respective connected one of the plurality of nodes connected to the plurality of terminals, call setting signals having data transmission format parameters including a priority of data to be transmitted are transmitted and a data transmission state of the data transmission system is optimumly controlled on the basis of the data transmission format parameters, each node of the plurality of nodes comprising:

first storage means for storing therein the data transmission format parameters of calls being currently set in the node;

first processing means, after the data transmission format parameters of the inputted call setting signal are stored in the first storage meads, for monitoring a traffic state of the node on the basis of the data transmission format parameters of the calls stored in the first storage means including the stored data transmission format parameters of the inputted call setting signal, for connecting the call designated by the call setting signal if the monitored traffic density does not exceed a range of a traffic density managed by the node when the call designated by the call setting signal is accepted, for changing the data transmission format parameters of a call with a low priority to an optimum value within the range of the traffic density managed by the node on the basis of priorities of the data transmission format parameters of the calls stored in the first storage means if the traffic density exceeds the range of the traffic density managed by the node when the call designated by the call setting signal is accepted and, in that case, subsequent to the changing to the optimum value, for connecting the call designated by the call setting signal; and first transmission means for sending a status signal containing the data transmission format parameters in the call setting signal accepted by the first processing means and a first call control signal containing the data transmission format parameters of the call to be changed to the control node, the control node comprising:

second storage means for storing therein current call setting states of the plurality of nodes based on the status signal sent from the first transmission means and the data transmission format parameters in the first call control signal and also relationship data between the plurality of nodes and the terminals connected to the plurality of nodes;

second processing means for storing in the second storage means the status signal and the data transmission format parameters of the call in the first call control signal when the status signal and the first call control signal are accepted, and making reference to the relationship data stored in the second storage means when the first call control signal is received so as to detect a node connected to a terminal handling the call in the first call control signal; and second transmission means for sending a second call control signal including the data transmission format parameters of the call to be changed in the first call control signal transmitted to the node detected by the second processing means.

10. A data transmission control system as set forth in claim 9, wherein each of the plurality of terminals includes change means for changing the call to a data transmission format indicated by the data transmission format parameters in the first call control signal transmitted from the first transmission means.

11. The system as set forth in claim 10, wherein the first processing means monitors the traffic density of the node and, when the monitored traffic density exceeds the traffic density managed by the node due to the change of the data transmission format by the change means, changes the data transmission format parameters of the call with the low priority on the basis of the priorities in the data transmission format parameters of the calls stored in the first storage means.

* * * * *